United States Patent
Lee et al.

(10) Patent No.: US 12,540,408 B2
(45) Date of Patent: Feb. 3, 2026

(54) ELECTROPHORETIC COMPOSITION AND METHOD FOR PREPARING THE SAME

(71) Applicants: LG Display Co., Ltd., Seoul (KR); NANO Solution CO., LTD, Jeonju-si (KR)

(72) Inventors: SuJeong Lee, Seoul (KR); SungHee Kim, Paju-si (KR); Hyungyul Kim, Seongnam-si (KR); HoJun Moon, Jeonju-si (KR)

(73) Assignees: LG DISPLAY CO., LTD., Seoul (KR); NANO SOLUTION CO., LTD, Jeonju-si (KR)

(*) Notice: Subject to any disclaimer, the term of this patent is extended or adjusted under 35 U.S.C. 154(b) by 489 days.

(21) Appl. No.: 17/893,719

(22) Filed: Aug. 23, 2022

(65) Prior Publication Data
US 2023/0084451 A1 Mar. 16, 2023

(30) Foreign Application Priority Data

Aug. 31, 2021 (KR) .......... 10-2021-0115829

(51) Int. Cl.
*C25B 7/00* (2006.01)
*C08K 3/04* (2006.01)
*C09D 5/44* (2006.01)
*C25B 15/08* (2006.01)

(52) U.S. Cl.
CPC ............ *C25B 7/00* (2013.01); *C08K 3/04* (2013.01); *C09D 5/4407* (2013.01); *C25B 15/083* (2021.01); *C08K 2201/006* (2013.01)

(58) Field of Classification Search
None
See application file for complete search history.

(56) References Cited

U.S. PATENT DOCUMENTS

| | | | |
|---|---|---|---|
| 4,379,077 A * | 4/1983 | Solomon | C25B 11/04 502/184 |
| 7,170,670 B2 * | 1/2007 | Webber | G02F 1/167 359/296 |
| 10,640,630 B2 * | 5/2020 | Belmont | B60C 1/0016 |
| 2006/0245037 A1 | 11/2006 | Yamamoto et al. | |
| 2013/0250398 A1 * | 9/2013 | Takanashi | C09C 1/48 423/449.8 |
| 2013/0295501 A1 * | 11/2013 | Zhang | C09D 11/101 522/111 |
| 2014/0340430 A1 * | 11/2014 | Telfer | G02F 1/1685 345/107 |
| 2017/0113202 A1 * | 4/2017 | Shawabkeh | B01J 20/3071 |
| 2023/0148203 A1 | 5/2023 | Park et al. | |

FOREIGN PATENT DOCUMENTS

| | | |
|---|---|---|
| CN | 102959463 A | 3/2013 |
| KR | 10-0711746 B1 | 4/2007 |
| KR | 10-2012-0001467 A | 1/2012 |
| KR | 10-2013-0006536 A | 1/2013 |
| KR | 10-2015-0077163 A | 7/2015 |
| KR | 10-2021-0098553 A | 8/2021 |

OTHER PUBLICATIONS

Office Action dated Jun. 19, 2023 issued in corresponding Korean Patent Application No. 10-2021-0115829.
Office Action dated Dec. 5, 2025, issued in Chinese Application No. 202210954704.7 with machine translation. Note: US 2013-0295501 A1 cited therein is already of record.

* cited by examiner

*Primary Examiner* — Katarzyna I Kolb
(74) *Attorney, Agent, or Firm* — Morgan, Lewis & Bockius LLP

(57) ABSTRACT

The present disclosure relates to an electrophoretic composition and a method for preparing the same, and more particularly, to an electrophoretic composition which is applicable to a variable transmittance device which uses an electrophoretic method and a method for preparing the same. According to the exemplary embodiments of the present disclosure, an electrophoretic composition which minimizes the settling problem caused by the gravity and allows the electrophoretic particles to maintain the stably dispersed pattern in the solvent and a method for preparing the same may be provided.

11 Claims, No Drawings

ELECTROPHORETIC COMPOSITION AND METHOD FOR PREPARING THE SAME

CROSS-REFERENCE TO RELATED APPLICATIONS

This application claims the priority of Korean Patent Application No. 10-2021-0115829 filed on Aug. 31, 2021, in the Korean Intellectual Property Office, the disclosure of which is incorporated herein by reference.

BACKGROUND

Technical Field

The present disclosure relates to an electrophoretic composition and a method for preparing the same, and more particularly, to an electrophoretic composition which is applicable to a variable transmittance device which uses an electrophoretic method and a method for preparing the same.

Discussion of the Related Art

Recently, a smart window which controls energy loss and light transmission through a window is being rapidly employed to rearview mirrors for vehicles, transmissive screens, and window panels for exhibition halls.

As a smart window implementing method which has been developed so far, a polarized particle method, a liquid crystal method, an electrochromic method, a photochromic method, and a thermochromic method have been reported. Among them, an electrochromic (EC) device which electrically controls the light transmittance is a representative example. In the case of the EC, basically, a colored thin film part absorbs light to control the transmittance so that when a temperature rises, there is a problem in the stability of the product and it is difficult to enlarge the area due to the technical difficulty of the producing method.

Another implementing method of a smart window is a transmittance control technique using electrophoretic particles. According to this method, if charged black nanoparticles in an organic matrix having a high boiling point are injected between the finely patterned ITO electrodes and a voltage is applied thereto, the black nanoparticles moves to the patterned electrode area in a dispersed state to control the light transmittance. Such an electrophoretic nanoparticle smart window has an advantage in that a transparent/opaque state is freely adjusted instantaneously depending on whether a voltage is applied.

However, generally, a solvent used for the electrophoretic composition is a hydrocarbon-based solvent or silicon oil with a low dielectric constant and a specific gravity is 0.7 to 0.9. However, a specific gravity of a general electrophoretic particle is 1.7 to 1.9 which is much higher than that of the solvent so that when the electrophoretic device is vertically mounted, there is a problem in that poor settling of the electrophoretic particles is caused due to the gravity so that the driving of the particles is significantly degraded.

In the meantime, Korea Registered Patent No. 10-0711746 discloses an electrophoretic particle prepared in a desired charged state by controlling a charge polarity and an amount of charge of the electrophoretic particles and a method for preparing the same. However, a method of minimizing the settling problem of the particles and aggregation between particles has not been proposed.

RELATED ART DOCUMENT

Patent Document (Patent Document 1) Korean Registered Patent No. 10-0711746

SUMMARY

Accordingly, embodiments of the present disclosure are directed to an electrophoretic composition and a method for preparing the same that substantially obviate one or more of the problems due to limitations and disadvantages of the related art.

An aspect of the present disclosure is to provide an electrophoretic composition which is capable of being utilized to a transmittance control device using an electrophoretic method and a method for preparing the same.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a method for preparing an electrophoretic composition comprises: preparing porous carbon particles having the OH group introduced on a surface by washing and drying, mixing and primarily dispersing porous carbon particles having the OH group introduced on the surface, a dispersant including the NH group, and a solvent, forming a porous carbon particle-dispersant complex by heating the primarily dispersed mixture, obtaining a porous carbon particle-dispersant complex formed by removing an unreacted material, and controlling a concentration of the dispersant to allow the complex to form a micelle.

In some exemplary embodiments, a specific surface area of the porous carbon particle may be 200 to 2000 $m^2/g$.

In some exemplary embodiments, the acid may be nitric acid ($HNO_3$), sulfuric acid ($H_2SO_4$), hydrochloric acid (HCl), hydrobromic acid (HBr), hydroiodic acid (HI), perchloric acid ($HClO_4$), or mixtures thereof.

In some exemplary embodiments, the mixing and refluxing the porous carbon particles and the acid may be performed at 100 to 120° C. for 2 to 10 hours.

In some exemplary embodiments, the base may be sodium hydroxide (NaOH), potassium hydroxide (KOH), ammonia ($NH_3$), lithium acetate ($CH_3COOLi$), sodium acetate, potassium acetate ($CH_3COOK$), sodium hydrogen carbonate ($NaHCO_3$), potassium hydrogen carbonate ($KHCO_3$), sodium carbonate ($Na_2CO_3$), potassium carbonate ($K_2CO_3$), or a mixture thereof.

In some exemplary embodiments, the solvent may be an isoparaffinic solvent having a specific gravity of 0.6 to 1.0.

In some exemplary embodiments, the dispersant including the NH group may be polyisobutylene succinimide (PIBSI).

In some exemplary embodiments, the primary dispersion may be performed 5 to 15 times at a pressure of 10000 to 25000 Psi.

In some exemplary embodiments, the heating the primarily dispersed mixture is performed at 50 to 80° C.

In some exemplary embodiments, in the obtaining a porous carbon particle-dispersant complex formed by removing an unreacted material, a lower layer may be collected by primary centrifugation and then secondarily dispersed and thereafter, an upper layer may be collected by secondary centrifugation.

In some exemplary embodiments, 30 vol % or lower of the lower layer may be collected from the entire primarily centrifuged solution.

In some exemplary embodiments, the secondary dispersion may be performed 1 to 5 times at a pressure of 10000 to 25000 Psi.

In some exemplary embodiments, 70 vol % or lower of the upper layer may be collected from the entire secondarily centrifuged solution.

In some exemplary embodiments, in the adding a dispersant including the NH group after collecting the upper layer by the secondary centrifugation, the dispersant may be added such that a weight ratio of the porous carbon particles and the dispersant may be 1:2 to 7.

According to the exemplary embodiments, an electrophoretic composition including a complex of porous carbon particles having a specific surface area of 200 to 2000 m$^2$/g and the dispersant and a solvent may be provided.

In some exemplary embodiments, a weight ratio of the porous carbon particle and the dispersant may be 1:2 to 7.

In some exemplary embodiments, the complex may be formed by reacting the porous carbon particles including COOH and OH groups on a surface and a dispersant including an NH group.

In some exemplary embodiments, the dispersant may be polyisobutylene succinimide (PIBSI).

In some exemplary embodiments, a specific gravity of the porous carbon particle-dispersant complex may be 1.1 to 1.2.

According to the exemplary embodiments of the present disclosure, an electrophoretic composition which minimizes the settling problem caused by the gravity and allows the electrophoretic particles to maintain the stably dispersed pattern in the solvent and a method for preparing the same may be provided.

It is to be understood that both the foregoing general description and the following detailed description are exemplary and explanatory and are intended to provide further explanation of the inventive concepts as claimed.

DETAILED DESCRIPTION

Hereinafter, exemplary embodiments of the present disclosure will be described in more detail. However, the following exemplary embodiments described in this specification are exemplified as desirable exemplary embodiments of the present disclosure and serve to further understand the technical spirit of the present disclosure together with the above-described summary of the present invention. Accordingly, the present disclosure should not be construed as being limited only to the following matters.

In this specification, "electrophoretic composition" is an ink composition which is used for an electrophoretic device and refers to a composition including a particle which may carry a charge, a dispersant, and a solvent.

According to the exemplary embodiments, a method of preparing an electrophoretic composition of the present disclosure includes: mixing and refluxing porous carbon particles and acid, neutralizing with a base after cooling down, preparing porous carbon particles with —COOH and OH groups which are introduced on a surface by washing and drying, mixing porous carbon particles with COOH and OH groups on the surface, a dispersant including NH group, and a solvent to primarily disperse, forming a porous carbon particle-dispersant complex by heating the primarily dispersed mixture, obtaining a porous carbon particle-dispersant complex formed by removing an unreacted material, and controlling a concentration of the dispersant to allow the complex to form micelle.

In the step of mixing and refluxing porous carbon particles and acid, the porous carbon particles and the acid are injected in a reactor to be mixed and refluxed.

According to exemplary embodiments, the porous carbon particles have a regular or irregular structure and have non-uniform micro pores formed therein. The porous carbon particles are aggregated and have a hollow formed therein.

As a specific exemplary embodiment, the porous carbon particles may have a specific surface area of 200 to 2000 m$^2$/g and desirably, may be 500 to 1700 m$^2$/g, and more desirably, 700 to 1500 m$^2$/g.

When the specific surface area is less than 200 m$^2$/g, the settling speed of the electrophoretic particles due to the gravity is increased. When the specific surface area exceeds 2000 m$^2$/g, the electrophoretic particles are not satisfactorily dispersed, an amount of the dispersant added to the composition is considerably increased, and thus the viscosity is increased so that the driving speed is significantly lowered.

As a specific example, the acid may be nitric acid ($HNO_3$), sulfuric acid ($H_2SO_4$), hydrochloric acid (HCl), hydrobromic acid (HBr), hydroiodic acid (HI), perchloric acid ($HClO_4$), or mixtures thereof. Desirable, the acid may be a mixture of nitric acid and sulfuric acid and more desirably, a mixture of the nitric acid and the sulfuric acid with a concentration ratio of 3:0.5 to 2.

As a specific exemplary embodiment, the step of mixing and refluxing the porous carbon particles and the acid may be performed at 100 to 120° C. for 5 to 24 hours. Desirably, the step of mixing and refluxing may be performed at 105 to 115° C. for 8 to 18 hours, and more desirably, at 108 to 112° C. for 10 to 16 hours.

In the step of neutralizing after cooling down, the reactant is cooled after the reflux and then neutralized using the base to form by-products that can be removed by washing.

As a specific exemplary embodiment, the base is sodium hydroxide (NaOH), potassium hydroxide (KOH), ammonia ($NH_3$), lithium acetate ($CH_3COOLi$), sodium acetate, potassium acetate ($CH_3COOK$), sodium hydrogen carbonate ($NaHCO_3$), potassium hydrogen carbonate ($KHCO_3$), sodium carbonate ($Na_2CO_3$), potassium carbonate ($K_2CO_3$), or a mixture thereof.

As a specific example, the base may be added until the pH reaches a desired neutral pH. For example, the reactant is neutralized to a pH within the range of approximately 5.0 to approximately 8.0 or approximately 6.0 to approximately 7.5.

In the step of preparing porous carbon particles having COOH and OH groups introduced on a surface by washing and drying, first, the neutralized reactant is washed with water or distilled water to remove by-products which may be dissolved in water. During the washing process, the impurities or by-products are filtered and removed using a filter cloth, a filter, or a mesh net, and for example, a reduced pressure filter may be used.

After the washing, a predetermined amount of moisture is still contained so that the viscosity is shown and it is deformable. Therefore, the moisture is completely removed by means of the drying process. The porous carbon particles having COOH and OH groups introduced on the surface may be obtained.

However, the exemplary embodiment is not limited thereto, but as the drying method, a freeze-drying method or a supercritical drying method may be used, and desirably, the freeze-drying method may be used. The freeze-drying method may be performed using the known freeze-drying method, for example, during the freeze-drying, a temperature may be set to a range of approximately −90 to −50° C., specifically, a range of approximately −85 to −60° C., and more specifically a range of approximately −80 to −70° C. In the meantime, the drying or the freeze-drying is performed at a reduced pressure so that the pressure is approximately 600 Torr or lower, specifically, approximately 1 to 100 Torr, and more specifically, approximately 2 to 10 Torr.

The step of mixing and primarily dispersing the porous carbon particles having COOH and OH groups introduced on the surface, the dispersant including the NH group, and the solvent is uniformly mixing and dispersing the porous carbon particles having COOH and OH groups introduced on the surface together with the dispersant and the solvent.

For the primary dispersion, a known dispersing device may be used and a disperser, a high-pressure disperser, a nano-high pressure disperser, and an ultrasonic disperser may be used. Even though it is not specifically limited, when the high pressure disperser is used, the porous carbon particles having COOH and OH groups introduced on the surface and the dispersant may be uniformly mixed and dispersed in the solvent. Therefore, the COOH and OH groups of the surface of the porous carbon particles and the NH group of the dispersant actively react to form a porous carbon particle-dispersant complex.

The dispersant including the NH group reacts with the COOH of the surface of the porous carbon particle and forms an amid bond so that at least a part may form the porous carbon particle-dispersant complex. The porous carbon particle-dispersant complex may form a micelle in the solvent. The dispersant may allow the porous carbon particles and the porous carbon particle-dispersant complex to be uniformly dispersed in the entire solvent without being aggregated in one place.

As a specific exemplary embodiment, the dispersant including the NH group may be polyisobutylene succinimide (PIBSI).

As a specific exemplary embodiment, the dispersant including the NH group may be included in a weight ratio of 0.5 to 4:1 based on the porous carbon particles having COOH and OH groups introduced on the surface.

As a specific exemplary embodiment, as the solvent, an alkane mixture having 6 to 13 carbon atoms and an isoparaffinic solvent having a specific gravity of 0.6 to 1.0 may be used. For example, isopar C, isopar G, isopar E(Exxon), ISOL-C(SK Chem), or ISOL-G(Exxon) may be used.

As a specific example, the primary dispersion may be performed 5 to 15 times at a pressure of 10000 to 25000 Psi. Desirably, the primary dispersion may be performed 7 to 13 times at a pressure of 12000 to 24000 Psi, and more desirably, 9 to 11 times at a pressure of 15000 to 23000 Psi. Within this range, the dispersibility and the dispersion stability of the porous carbon particles having the OH group introduced on the surface may be remarkably implemented.

The step of heating the primarily dispersed mixture is reacting the COOH and OH groups of the surface of the porous carbon particles which are uniformly mixed and dispersed in the solvent and the NH group of the dispersant to form the porous carbon particle-dispersant complex. The heating may be performed at 50 to 80° C. so as to form the porous carbon particle-dispersant complex by the stable reaction.

In the step of obtaining the porous carbon particle-dispersant complex formed by removing the unreacted materials, the unreacted porous carbon particles, dispersant, and other by-products are removed using filtration or centrifugation.

As a specific exemplary embodiment, in the step of obtaining the porous carbon particle-dispersant complex formed by removing the unreacted materials, the reaction solution including the porous carbon particle-dispersant complex is primarily centrifuged to collect a lower layer, secondarily dispersed, and then secondarily centrifuged to collect an upper layer.

30 vol % or lower of the lower layer may be collected from the entire primarily centrifuged solution.

In the secondary dispersion, the porous carbon particle-dispersant complex included in the lower layer may be uniformly dispersed. For the secondary dispersion, a known dispersing device such as a disperser, a high pressure disperser, a nano high pressure disperser, and an ultrasonic disperser may be used. Even though it is not specifically limited, the high pressure disperser may be desirably used.

As a specific example, the secondary dispersion may be performed 1 to 5 times at a pressure of 10000 to 25000 Psi. Desirably, the secondary dispersion may be performed 2 to 4 times at a pressure of 12000 to 24000 Psi, and more desirably, 3 times at a pressure of 15000 to 23000 Psi. Within this range, the dispersibility and the dispersion stability of the porous carbon particle-dispersant complex may be remarkably implemented.

When the secondary centrifugation is performed and the upper layer is collected, the centrifugation is used to remove the lower layer having a bad dispersibility. At this time, 70 vol % or lower of the upper portion may be collected from the entire secondary centrifuged solution.

In the step of adjusting a concentration of the dispersant so as to form a micelle from the complex, the dispersant is added at a critical micelle concentration (CMC) or more. By doing this, the porous carbon particle-dispersant complex may generate the micelle in the solvent.

As a specific exemplary embodiment, the dispersant is added such that a weight ratio of the porous carbon particles and the dispersant is 1:2 to 7. When the dispersant is added within the above-mentioned range, a micelle shape of the porous carbon particle-dispersant complex is not broken. When an electricity is applied, the driving performance of the electrophoretic particles and the transmittance adjustment performance of the electrophoretic device may be maintained to be excellent.

As exemplary embodiments, an electrophoretic composition including a complex of porous carbon particles having a specific surface area of 200 to 2000 m$^2$/g and the dispersant and a solvent may be provided.

In some exemplary embodiments, the weight ratio of the porous carbon particles and the dispersant is desirably 1:2 to 7.

The complex is formed by reacting the porous carbon particles including the COOH and OH groups on the surface and the dispersant including the NH group and the complex may form the micelle.

In some exemplary embodiments, a specific gravity of the porous carbon particle-dispersant complex may be 1.1 to 1.2. In this case, the difference of the specific gravity from the solvent is minimized to suppress the settling failure due to the gravity and improve the driving speed of the electrophoretic particles when the electricity is applied.

In the electrophoretic composition, the porous carbon particles including the OH group, the dispersant including the NH group, the solvent, and the complex of the porous carbon particles and the dispersant correspond to the substantially same configuration as in the above-described method for preparing the electrophoretic composition. Therefore, the description thereof will be omitted.

Hereinafter, even though for better understanding of the present disclosure, preferred embodiments are proposed, the embodiments are merely illustrative of the present disclosure, but do not limit the appended claims. It will be apparent to those skilled in the art that various modifications and changes will be made without departing from the scope of the present invention and the range of the technical spirit and the modifications and changes are intended to fall within the scope of the appended claims.

EXAMPLE AND COMPARATIVE EXAMPLE

Example 1

10 g of porous carbon particles having a specific surface area of 1200 $m^2/g$, 120 ml of nitric acid ($HNO_3$), and 40 ml of sulfuric acid ($H_2SO_4$) were added to a flask equipped with a reflux device and refluxed at 110° C. for 5 hours. Thereafter, after cooling the flask to the room temperature, the product was neutralized with 5% NaOH. After filtering the product with a reduced pressure filter and washing the product with the distilled water, the product was frozen with liquid nitrogen to remove the moisture and then freeze-dried using a freeze dryer to obtain porous carbon particles having COOH and OH groups introduced on the surface.

8 wt % of polyisobutylene succinimide (PIBSI) as a dispersant and 88 wt % of isopar L as a solvent were dispersed in 4 wt % of porous carbon particles having the OH group introduced on the surface 10 times at approximately 23,000 Psi using a high-pressure disperser. After heating at approximately 80° C., a reactant was centrifuged to collect approximately 30 vol % of a lower layer. The collected lower layer was re-distributed three times at approximately 23000 Psi using the high pressure disperser. This was centrifuged to collect approximately 70 vol % of the upper layer. By measuring an absorbance and a solid content of the collected upper layer, polyisobutylene succinimide (PIBSI) was additionally added to make a weight ratio (dispersant/porous carbon particles) of the dispersant with respect to the porous carbon particles approximately 5.0 to produce the electrophoretic composition.

The electrophoretic composition was injected in a previously prepared electrophoretic cell to produce an electrophoretic device.

Example 2

Except that 10 g of porous carbon particles having a specific surface area of approximately 2000 $m^2/g$ was used, porous carbon particles having COOH and OH groups introduced on the surface, the electrophoretic composition, and the electrophoretic device were prepared using the same method as in Example 1.

Example 3

Except that 10 g of porous carbon particles having a specific surface area of approximately 200 $m^2/g$ was used, porous carbon particles having COOH and OH groups introduced on the surface, the electrophoretic composition, and the electrophoretic device were prepared using the same method as in Example 1.

Example 4

Except that the electrophoretic composition was prepared by additionally adding polyisobutylene succinimide (PIBSI) so as to make the weight ratio of the dispersant with respect to the porous carbon particles (dispersant/porous carbon particles) approximately 7.0, porous carbon particles having COOH and OH groups introduced on the surface, the electrophoretic composition, and the electrophoretic device were prepared using the same method as in Example 1.

Example 5

Except that the electrophoretic composition was prepared by additionally adding polyisobutylene succinimide (PIBSI) so as to make the weight ratio of the dispersant with respect to the porous carbo particles (dispersant/porous carbon particles) approximately 2.0, porous carbon particles having COOH and OH groups introduced on the surface, the electrophoretic composition, and the electrophoretic device were prepared using the same method as in Example 1.

Comparative Example 1

8 wt % of polyisobutylene succinimide (PIBSI) as a dispersant and 88 wt % of isopar L as a solvent were dispersed in 4 wt % of porous carbon particles (10 g) having a specific surface area of approximately 1200 $m^2/g$ 10 times at approximately 23000 Psi using a high-pressure disperser. This was centrifuged to collect approximately 70 vol % of upper layer. By measuring an absorbance and a solid content of the collected upper layer, polyisobutylene succinimide (PIBSI) was additionally added to make a weight ratio (dispersant/porous carbon particles) of the dispersant with respect to the porous carbon particles approximately 5.0 to produce the electrophoretic composition.

The electrophoretic composition was injected in a previously prepared electrophoretic cell to produce an electrophoretic device.

Comparative Example 2

8 wt % of polyisobutylene succinimide (PIBSI) as a dispersant and 88 wt % of isopar L as a solvent were dispersed in 4 wt % of porous carbon particles having COOH and OH groups introduced on the surface produced according to Example 1 10 times at approximately 23000 Psi using a high-pressure disperser. This was centrifuged to collect approximately 70 vol % of upper layer. By measuring an absorbance and a solid content of the collected upper layer, polyisobutylene succinimide (PIBSI) was additionally added to make a weight ratio (dispersant/porous carbon particles) of the dispersant with respect to the porous carbon particles approximately 5.0 to produce the electrophoretic composition.

The electrophoretic composition was injected in a previously prepared electrophoretic cell to produce an electrophoretic device.

Comparative Example 3

8 wt % of polyisobutylene succinimide (PIBSI) as a dispersant and 88 wt % of isopar L as a solvent were dispersed in 4 wt % of porous carbon particles (10 g) having a specific surface area of approximately 1200 $m^2/g$ 10 times at approximately 23000 Psi using a high-pressure disperser. After heating at approximately 80° C., a reactant was centrifuged to collect approximately 70 vol % of the upper layer. By measuring an absorbance and a solid content of the collected upper layer, polyisobutylene succinimide (PIBSI) was additionally added to make a weight ratio (dispersant/porous carbon particles) of the dispersant with respect to the porous carbon particles approximately 5.0 to produce the electrophoretic composition.

The electrophoretic composition was injected in a previously prepared electrophoretic cell to produce an electrophoretic device.

Comparative Example 4

Except that the electrophoretic composition was prepared by additionally adding polyisobutylene succinimide (PIBSI) so as to make the weight ratio of the dispersant with respect to the porous carbo particles (dispersant/porous carbon particles) approximately 1.5, the porous carbon particles having COOH and OH groups introduced on the surface, the electrophoretic composition, and the electrophoretic device were prepared using the same method as in Example 1.

Comparative Example 5

Except that the electrophoretic composition was prepared by additionally adding polyisobutylene succinimide (PIBSI) so as to make the weight ratio of the dispersant with respect to the porous carbo particles (dispersant/porous carbon particles) approximately 9.0, the porous carbon particles having COOH and OH groups introduced on the surface, the electrophoretic composition, and the electrophoretic device were prepared using the same method as in Example 1.

Comparative Example 6

Except that 10 g of porous carbon particles having a specific surface area of approximately 2400 $m^2/g$ was used, the porous carbon particles having COOH and OH groups introduced on the surface, the electrophoretic composition, and the electrophoretic device were prepared using the same method as in Example 1.

Comparative Example 7

Except that 10 g of porous carbon particles having a specific surface area of approximately 100 $m^2/g$ was used, the porous carbon particles having COOH and OH groups introduced on the surface, the electrophoretic composition, and the electrophoretic device were prepared using the same method as in Example 1.

EXPERIMENTAL EXAMPLE

Experimental Example 1: Analysis of Particle Size of Electrophoretic Composition A particle size of the particles included in the electrophoretic composition prepared according to Examples and Comparative Examples was analyzed. After diluting the electrophoretic composition to make a weight ratio of electrophoretic composition:Isopar-L 1:1000 using the Isopar-L, the particle size was measured using a particle size analyzer (Otsuka Electrons, ELSZ-2000).

Experimental Example 2: Evaluation of Shielding Property of Electrophoretic Device The device prepared according to Examples and Comparative Examples was placed on a backlight board (a luminance was 1000 $Cd/m^2$) and a luminance before driving a DC voltage was measured using a luminance measuring device (SANPOMETER Co., Ltd., SM208).

Experimental Example 3: Evaluation of Transmissibility of Electrophoretic Device The device prepared according to Examples and Comparative Examples was placed on a backlight board (luminance was 1000 $Cd/m^2$) and was driven by applying 30 V of DC voltage using a DC power supply (TOYOTECH corporation, DP20-3TP). A luminance (Max) 30 seconds later after applying a DC voltage was measured using a luminance measuring device (SANPOMETER Co., Ltd., SM208).

A luminance of an empty device in which the electrophoretic composition was not injected was 900 $Cd/m^2$.

Experimental Example 4: Evaluation of Driving Speed of Electrophoretic Device

The device prepared according to Examples and Comparative Examples was placed on a backlight board (a luminance was 1000 $Cd/m^2$) and was driven by applying 30 V of DC voltage using a DC power supply (TOYOTECH corporation, DP20-3TP). After applying 30 V of DC voltage, a time when particles move to reach 80% of the maximum luminance was measured using the luminance measuring device (SANPOMETER Co., Ltd., SM208).

The measurement result for Experimental Examples was represented in the following Table 1.

TABLE 1

| Classification | Initial Particle size $D_{90}$ (nm) | Driving characteristic (initial) | | | Driving characteristic (20 days later) | | |
|---|---|---|---|---|---|---|---|
| | | Driving speed (second) | Shielding property ($Cd/m^2$) | Transmissibility ($Cd/m^2$) | Driving speed (second) | Shielding property ($Cd/m^2$) | Transmissibility ($Cd/m^2$) |
| Ex. 1 | 226.9 | 8 | 50 | 785 | 8 | 50 | 785 |
| Ex. 2 | 262.5 | 10 | 50 | 714 | 11 | 50 | 709 |
| Ex. 3 | 205.5 | 9 | 50 | 790 | 9 | 50 | 790 |
| Ex. 4 | 216.8 | 8 | 57 | 790 | 8 | 57 | 787 |
| Ex. 5 | 238.3 | 11 | 51 | 709 | 11 | 51 | 701 |
| Comp. Ex. 1 | 236.5 | 15 | 50 | 660 | 20 | 50 | 590 |
| Comp. Ex. 2 | 230.7 | 13 | 50 | 725 | 17 | 50 | 610 |
| Comp. Ex. 3 | 242.3 | 16 | 56 | 684 | 18 | 58 | 662 |
| Comp. Ex. 4 | 239.2 | 17 | 62 | 590 | 20 | 66 | 516 |
| Comp. Ex. 5 | 203.7 | 7 | 47 | 790 | 10 | 52 | 625 |

TABLE 1-continued

| Classification | Initial Particle size $D_{90}$ (nm) | Driving characteristic (initial) | | | Driving characteristic (20 days later) | | |
|---|---|---|---|---|---|---|---|
| | | Driving speed (second) | Shielding property (Cd/m$^2$) | Transmissibility (Cd/m$^2$) | Driving speed (second) | Shielding property (Cd/m$^2$) | Transmissibility (Cd/m$^2$) |
| Comp. Ex. 6 | 291.3 | 11 | 53 | 627 | 13 | 53 | 608 |
| Comp. Ex. 7 | 347.5 | 17 | 48 | 586 | 24 | 59 | 326 |

Referring to Table 1, it was confirmed that in the case of the electrophoretic device including the electrophoretic composition of Examples 1 to 5 prepared according to the present disclosure, the driving speed and the shielding property were significantly improved as compared with that of Comparative Examples 1 to 4 and 7. Specifically, it was confirmed that the driving speed, the shielding property, and the transmissibility were maintained even after 20 days of preparing the electrophoretic device. In contrast, in the case of Comparative Examples 1 to 7, it was confirmed that the driving speed and the transmissibility were significantly degraded after 20 days of preparing the device. Specifically, as compared with Examples, it was confirmed that in Comparative Examples 1 to 3 which were prepared to be different from the preparing method according to the present disclosure, the driving speed was slowed at least 1.3 times to at most 2 times and after 20 days of preparing, the transmissibility was significantly degraded.

It will be apparent to those skilled in the art that various modifications and variations can be made in the electrophoretic composition and the method for preparing the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A method for preparing an electrophoretic composition, the method comprising:
   mixing and circulating porous carbon particles and an acid;
   neutralizing with a base after cooling down;
   preparing the porous carbon particles having COOH group introduced on a surface by washing and drying;
   mixing and primarily dispersing the porous carbon particles having COOH group introduced on the surface, a dispersant including an NH group, and a solvent;
   forming a porous carbon particle-dispersant complex by heating the primarily dispersed mixture, wherein the NH group of the dispersant reacts with the COOH of the surface of the porous carbon particle and forms an amid bond so that at least a part may form the porous carbon particle-dispersant complex;
   obtaining the porous carbon particle-dispersant complex formed by removing an unreacted material; and
   controlling a concentration of the dispersant to allow the complex to form a micelle,
   wherein the base includes ammonia (NH$_3$), lithium acetate (CH$_3$COOLi), sodium acetate, potassium acetate (CH$_3$COOK), sodium hydrogen carbonate (NaHCO$_3$), potassium hydrogen carbonate (KHCO$_3$), sodium carbonate (Na$_2$CO$_3$), potassium carbonate (K$_2$CO$_3$), or a mixture thereof.

2. The method for preparing an electrophoretic composition according to claim 1, wherein a specific surface area of the porous carbon particle is 200 to 2000 m$^2$/g.

3. The method for preparing an electrophoretic composition according to claim 1, wherein the acid is nitric acid (HNO$_3$), sulfuric acid (H$_2$SO$_4$), hydrochloric acid (HCl), hydrobromic acid (HBr), hydroiodic acid (HI), perchloric acid (HClO$_4$), or mixtures thereof.

4. The method for preparing an electrophoretic composition according to claim 1, wherein the solvent is an isoparaffinic solvent having a specific gravity of 0.6 to 1.0.

5. The method for preparing an electrophoretic composition according to claim 1, wherein the dispersant including the NH group is polyisobutylene succinimide (PIBSI).

6. The method for preparing an electrophoretic composition according to claim 1, wherein the primary dispersion is performed 5 to 15 times at a pressure of 10000 to 25000 Psi.

7. The method for preparing an electrophoretic composition according to claim 1, wherein in the obtaining the porous carbon particle-dispersant complex formed by removing an unreacted material, a lower layer is collected by primary centrifugation and secondarily dispersed and then, an upper layer is collected by secondary centrifugation.

8. The method for preparing an electrophoretic composition according to claim 7, wherein 30 vol % or lower of the lower layer is collected from the entire primarily centrifuged solution.

9. The method for preparing an electrophoretic composition according to claim 7, wherein the secondary dispersion is performed 1 to 5 times at a pressure of 10000 to 25000 Psi.

10. The method for preparing an electrophoretic composition according to claim 7, wherein 70 vol % or lower of the upper layer is collected from the entire secondarily centrifuged solution.

11. The method for preparing an electrophoretic composition according to claim 1, wherein in the controlling a concentration of the dispersant to allow the complex to form a micelle, the dispersant is added to control a concentration such that a weight ratio of the porous carbon particle and the dispersant becomes 1:2 to 7.

* * * * *